US006976654B2

(12) United States Patent
Ouellette et al.

(10) Patent No.: US 6,976,654 B2
(45) Date of Patent: Dec. 20, 2005

(54) VERTICAL TAKEOFF AND LANDING AIRCRAFT

(75) Inventors: Richard P. Ouellette, Lakewood, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 10/829,743

(22) Filed: Apr. 22, 2004

(65) Prior Publication Data

US 2005/0151004 A1      Jul. 14, 2005

Related U.S. Application Data

(62) Division of application No. 10/649,033, filed on Aug. 27, 2003, now Pat. No. 6,824,097.

(51) Int. Cl.[7] .............................................. B64D 27/20
(52) U.S. Cl. .................... 244/23 B; 244/23 A; 244/55; 244/58
(58) Field of Search ............................. 244/23 A, 23 R, 244/23 B, 23 C, 55, 58, 12.1, 12.3, 12.2, 244/73, 53 R, 57, 61

(56) References Cited

U.S. PATENT DOCUMENTS

| | | | | |
|---|---|---|---|---|
| 3,078,061 A | * | 2/1963 | Georges ..................... 244/12.1 |
| 3,134,561 A | * | 5/1964 | Deodat ......................... 244/58 |
| 3,777,487 A | * | 12/1973 | Norman et al. ............... 60/204 |
| 3,795,372 A | | 3/1974 | Feldman |
| 4,375,150 A | | 3/1983 | Nikiforakis |
| 4,566,699 A | * | 1/1986 | Cucuzza ..................... 244/12.2 |
| 4,817,889 A | * | 4/1989 | Henry ......................... 244/1 R |
| RE35,172 E | * | 3/1996 | Clark ........................... 60/247 |
| 5,557,926 A | * | 9/1996 | Hunter et al. ................ 60/247 |
| 5,579,633 A | * | 12/1996 | Hunter et al. ................ 60/204 |
| 5,611,824 A | | 3/1997 | Stephens |
| 5,845,480 A | | 12/1998 | DeFreitas et al. |
| 5,934,608 A | * | 8/1999 | Dockter ................... 244/17.19 |
| 6,216,446 B1 | * | 4/2001 | Stram .......................... 60/249 |
| 6,318,668 B1 | * | 11/2001 | Ulanoski et al. ........... 244/12.5 |
| 6,708,920 B2 | * | 3/2004 | Fukuyama ................. 244/12.4 |

FOREIGN PATENT DOCUMENTS

JP        357114710 A  *  7/1982  ............. B60F 5/12

\* cited by examiner

*Primary Examiner*—Teri Pham Luu
*Assistant Examiner*—Stephen A. Holzen
(74) *Attorney, Agent, or Firm*—Harness Dickey & Pierce P.L.C.

(57) ABSTRACT

A flight capable mobile platform adapted for covert deployment is provided. The mobile platform is additionally adapted to have a reduced vulnerability to hostile detection and aggression. The mobile platform includes a fuselage having a pair of sidewalls and a bottom. The sidewalls and bottom form an armored payload bay. The mobile platform additionally includes a pair of wings connected to the fuselage. The wings have a fixed wingspan constructed such that the mobile platform can be transported by a larger second mobile platform. This allows for the mobile platform to be aerial deployed from the larger second mobile platform. Each of the sidewalls include at least one pulse ejector thrust augmentor (PETA) bank that is canted outward. Therefore, thrust exhaust produced by each PETA bank is directed down and away from a centerline of the payload bay. Furthermore, the bottom of the mobile platform is adapted to allow ingress and egress of cargo, e.g. military troops, from the payload bay.

39 Claims, 12 Drawing Sheets

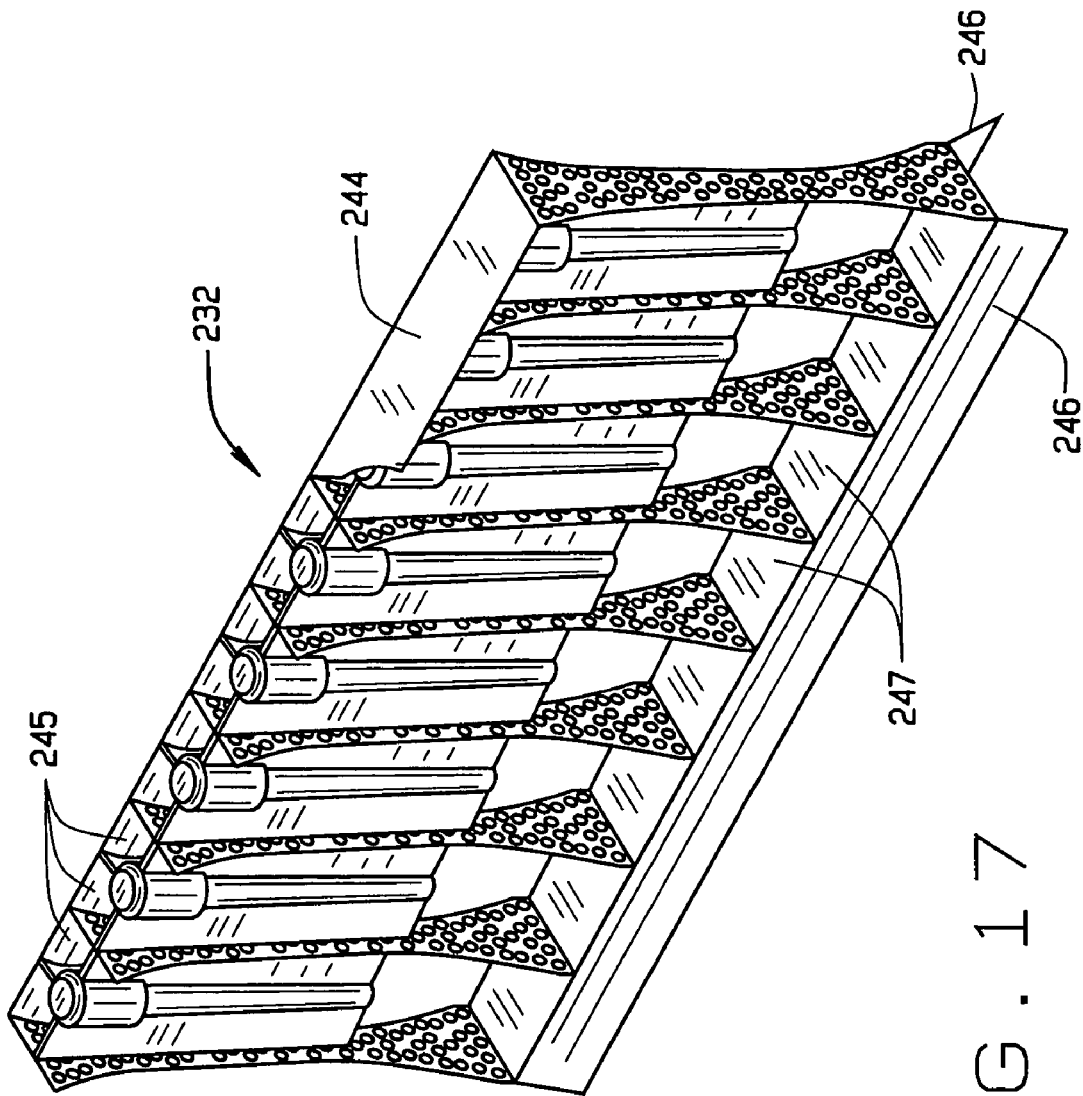

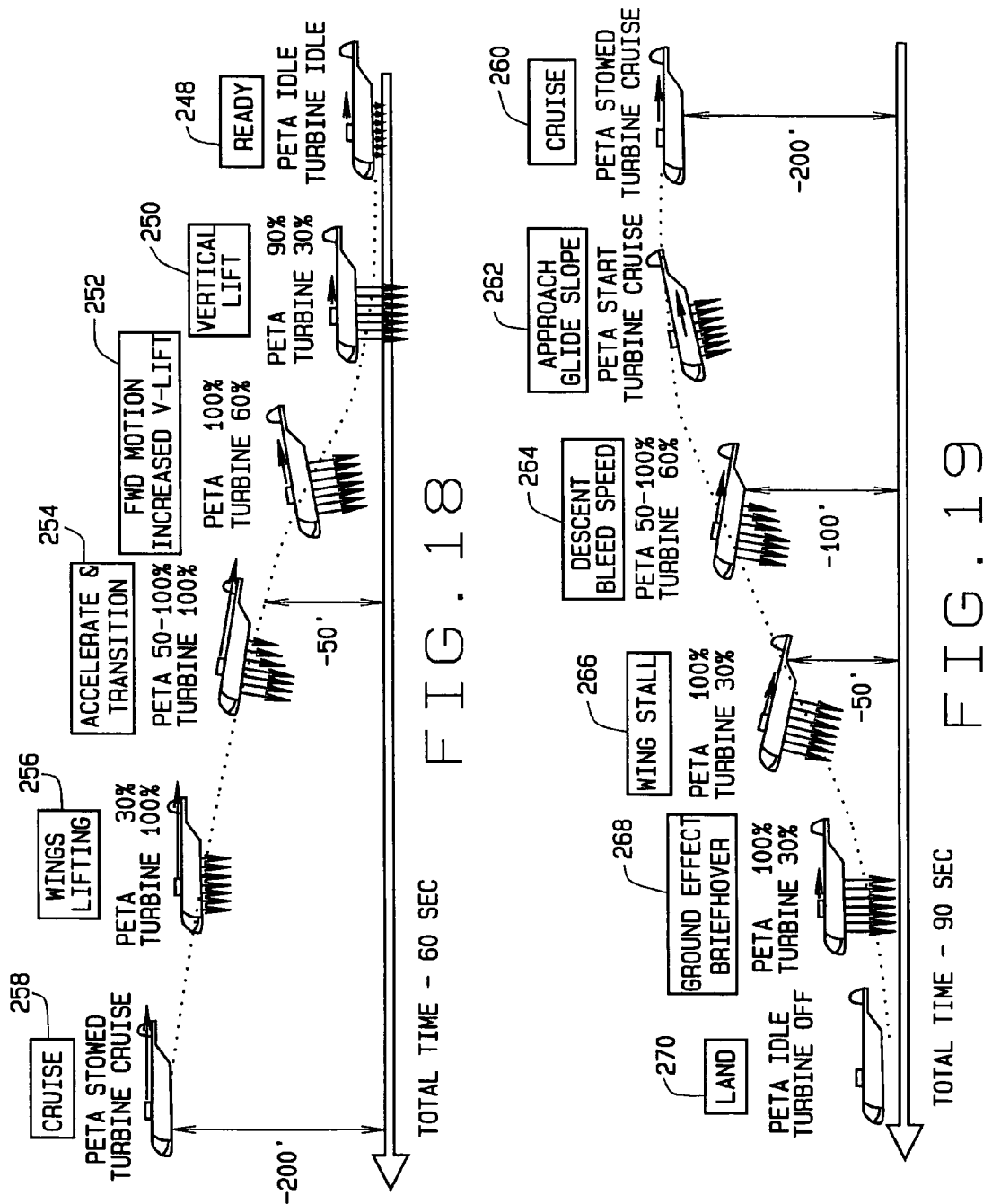

VERTICAL TAKEOFF AND LANDING AIRCRAFT

CROSS REFERENCE TO RELATED APPLICATIONS

This application is a divisional application of U.S. patent application Ser. No. 10/649,033, filed on Aug. 27, 2003, now U.S. Pat. No. 6,824,097. The disclosure of the above application is incorporated herein by reference in its entirety.

FIELD OF INVENTION

The present invention relates to flight capable mobile platforms aircraft and more specifically to a flight capable mobile platform, such as a vertical take off and landing (VTOL) aircraft, adapted for covert deployment and enhanced protection against hostile detection and aggression.

BACKGROUND OF THE INVENTION

Tactical vertical takeoff and landing (VTOL) aircraft are known. Such known tactical VTOL aircraft are generally quick and maneuverable rotary blade aircraft, i.e. helicopters, that are used for airborne special operations. Being small and relatively quiet, and having a sufficient load to size ratio, these VTOL aircraft have provided a stable platform for the special operations world. They are sufficiently suited for providing a 'ride to target' and air support for ground troops. Technical evolution of such known VTOL aircraft has resulted in VTOL aircraft that can be used for 'fast-rope' insertions and/or be outfitted with weapons such as mini .50 caliber machine guns, missiles, grenade launchers and aerial rockets. However, known tactical VTOL aircraft are still range/payload constrained and need to be flown with hostile ground fire, ever maturing radar, infrared and acoustic based threats in mind.

A variety of methods have been employed to provide vertical takeoff capability. These methods include providing ducts to redirect the discharge from a main propulsion unit, providing a tilt mechanism to permit main engine(s) to tilt, and providing separate engines for driving fan systems to lift the aircraft. Aircraft range and payload capabilities are reduced when weight and structural changes required to incorporate vertical takeoff capabilities are incorporated into an aircraft. For example, oversized axial propulsion will reduce cruise efficiency. The complexity of an aircraft designed to accommodate both horizontal and VTOL capabilities also increases the maintenance requirements on the aircraft and therefore increases the overall life cycle costs to operate the aircraft.

Additionally, known VTOL aircraft must still be operated in view of increasingly dangerous risks. For example, detection/observation methods such as radar, infrared, acoustical, electromagnetic, contrails and visual detection pose serious survivability threats to known VTOL aircraft. Acoustically, the rotors of typical VTOL aircraft generate a strong, broadband signature that is very distinctive making them very vulnerable to acoustical detection. Untreated engine exhaust create an easy target for shoulder launched heat seeking missiles and very little radar cross section detection is possible. The maturation of detection sensors and antiaircraft weapons has progressed to a point that aircrews and passengers are at an ever increasing risk.

A need therefore exists for a VTOL aircraft with the characteristics of affordability, enhanced range/payload, high speed, and low vulnerability to hostile detection and threats.

SUMMARY OF THE INVENTION

According to one preferred form, a flight capable mobile platform, such as a vertical take off and landing (VTOL) aircraft, adapted for covert deployment is provided. The mobile platform aircraft is additionally adapted to have a reduced vulnerability to hostile detection and aggression. The mobile platform aircraft includes a fuselage having a pair of sidewalls and a bottom. The sidewalls and bottom form an armored payload bay. The mobile platform aircraft additionally includes a pair of wings connected to the fuselage. The wings have a fixed wingspan constructed such that the aircraft can be transported by a larger aircraft. This allows for the aircraft to be aerial deployed from the larger aircraft. Each of the sidewalls include at least one pulse ejector thrust augmentor (PETA) bank that is canted outward. Therefore, thrust exhaust produced by each PETA bank is directed down and away from a centerline of the payload bay. Furthermore, the bottom of the aircraft is adapted to allow ingress and egress of cargo, e.g. military troops, from the payload bay.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the Invention.

BRIEF DESCRIPTION OF THE DRAWINGS

The present invention will become more fully understood from the detailed description and the accompanying drawings, wherein:

FIG. 17 is a perspective view of an individual bank of pulsejet engines showing the inlet and outlet cowls used to either isolate or control and trim the pulsejet engines;

FIG. 18 is a plurality of elevation views of a VTOL aircraft of the present Invention during the vertical lift stages to achieve flight;

FIG. 19 is a plurality of elevation views similar to FIG. 18 showing a VTOL aircraft of the present Invention during the various stages of a landing procedure;

DETAILED DESCRIPTION OF THE PREFERRED EMBODIMENTS

The following description of the preferred embodiment(s) is merely exemplary in nature and is in no way intended to limit the invention, its application, or uses.

Figure 1:
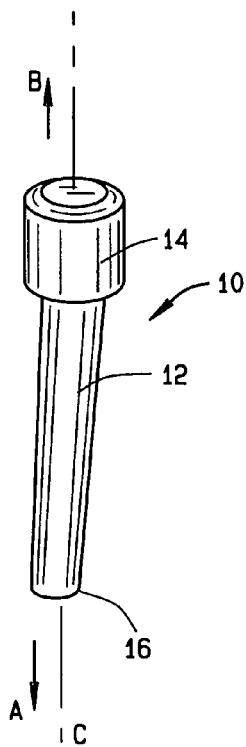
FIG. 1 is a side elevation view of a preferred embodiment of a pulsejet engine of the present invention.

Referring to FIG. 1, a pulsejet engine 10 is shown. The pulsejet engine 10 includes a body 12 having an inlet end 14 and an exhaust end 16. Propulsion thrust from the pulsejet engine 10 discharges from the exhaust end 16 in a propulsion exhaust direction A. Air, normally at atmospheric pressure, enters the inlet end 14. The air mixes with a fuel (discussed in reference to FIG. 11) which is detonated to produce thrust to propel a platform (not shown) in a platform travel direction B. In the exemplary preferred embodiment shown, both the airflow and the burned fuel/air mixture travel in the propulsion exhaust direction A approximately parallel with a pulsejet engine longitudinal centerline C. In one preferred embodiment, pulsejet engine 10 is constructed of a material, for example steel or titanium, that is highly resistive to thermal stresses and penetration by high velocity flying objects, such as hostile ground fire and flying debris.

Figure 2:
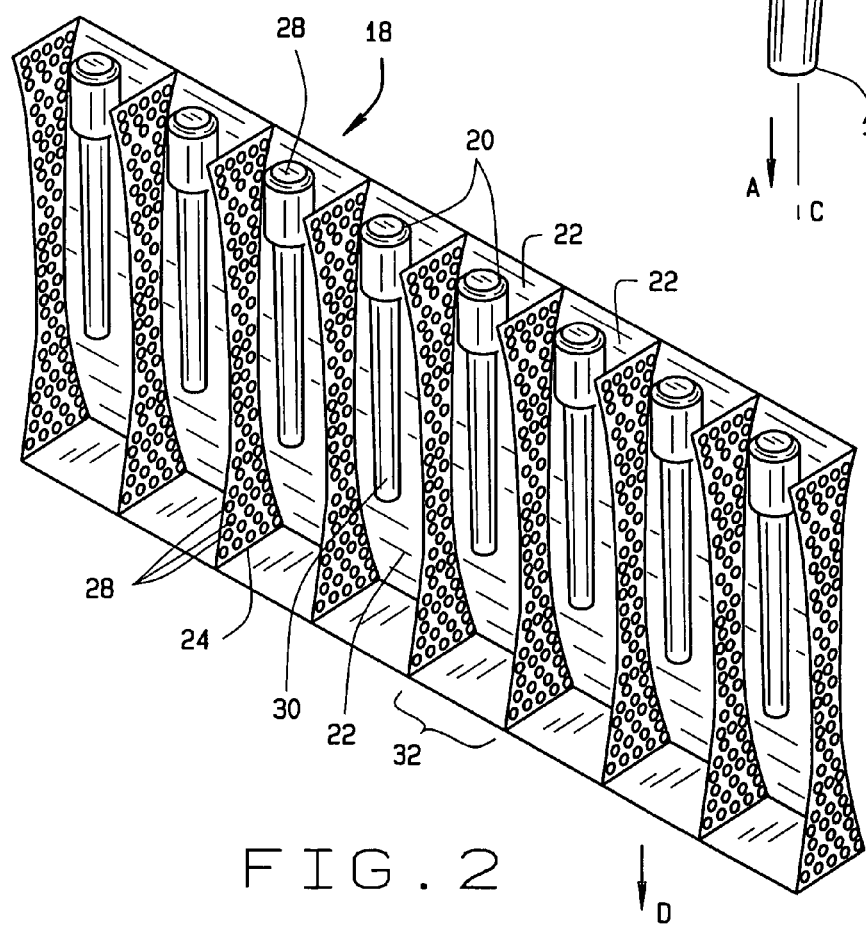
FIG. 2 is a perspective view of a group of pulsejets of FIG. 1 having ejectors wherein the ejectors are formed as augmentor cells of the present Invention.

Referring to FIG. 2, an exemplary pulsejet bank 18 is shown. Each pulsejet bank 18 includes a plurality of pulsejets 20. Each of the pulsejets 20 is structurally attached to a side panel 22. An opposed, second side panel has been removed from the view of FIG. 2 for clarity. The side panel 22 is curved to entrain and direct air together with the pulsejet exhaust to maximize thrust from each of the pulsejets 20 in the thrust direction D shown. A plurality of end plates 24 are connectably attached to the side panel 22 adjacent to each of the pulsejets 20. Each of the end plates 24 has a plurality of apertures 26 therethrough. The apertures 26 permit equalization of flow between each of the pulsejets 20 exhaust flows such that any of the pulsejets 20 within the pulsejet bank 18, which operate above or below a nominal operating condition, are equalized with the remaining pulsejets 20 of the pulsejet bank 18. Air enters each of the pulsejets 20 through a pulsejet inlet 28. The exhaust gas producing thrust from each of the pulsejets 20 is discharged from a pulsejet exhaust 30 in the thrust direction D. Each adjacent pair of end plates 24 connectably joined to opposed side panels 22 form each of a plurality of augmentor cells 32. Only one side panel 22 is shown in FIG. 2 for clarity. Fuel is supplied to each of the pulsejets 20 through a fuel injection system (shown and discussed with reference to FIG. 10). In one preferred embodiment, side panels 22 are constructed of a material, for example steel or titanium, that is highly resistive to penetration by high velocity flying objects, such as hostile ground fire and flying debris.

Figure 3:
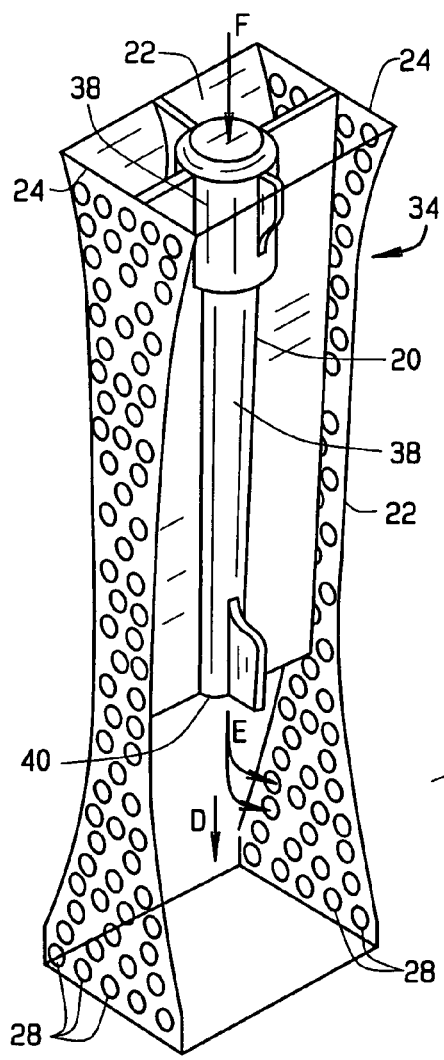
FIG. 3 is an elevation view of a single augmentor cell of the present invention having the pulsejet structurally mounted to the augmentor cell structure.

Referring now to FIG. 3, an exemplary pulsejet bay 34 is detailed. Each pulsejet bay 34 includes one augmentor cell 32 and one pulsejet 20. Each pulsejet 20 includes an inlet diffuser 36, a tuned section as a combustion chamber 38, and a discharge nozzle 40. A plurality of interfairing 42 join each pulsejet 20 with one or both of the side panels 22 and with one or more of the end plate 24 to form a unitary load bearing structure. One side panel 22 and a portion of one interfairing 42 have been removed from view in FIG. 3 for clarity. Although the interfairings 42 are shown to extend along the entire length of the pulsejet 20, the interfairing can extend along a portion of each pulsejet 20 without altering the scope of the invention. The interfairings 42 serve to uniformly distribute the flow longitudinally along the augmentor cell 32 while providing structural support through the side panels 22 and the end plates 24. In another preferred embodiment, a plurality of webs or intercostals (not shown) join each pulsejet 20 with one or both of the sidewalls 22. Discharge from each of the pulsejets 20 is in the thrust direction D as shown. A portion of the discharge from the pulsejet 20 exits through each of the plurality of apertures 26 in an ejector cross flow direction E. Air enters the inlet diffuser 36 in the air inlet flow direction F. The inlet diffuser 36 is connectably joined to the combustion chamber 38 and the combustion chamber 38 is connectably joined to the discharge nozzle 40. In still another preferred embodiment, each of the augmentor cells 32 can also be provided as an integral unit formed from a single piece of material.

Figure 4:
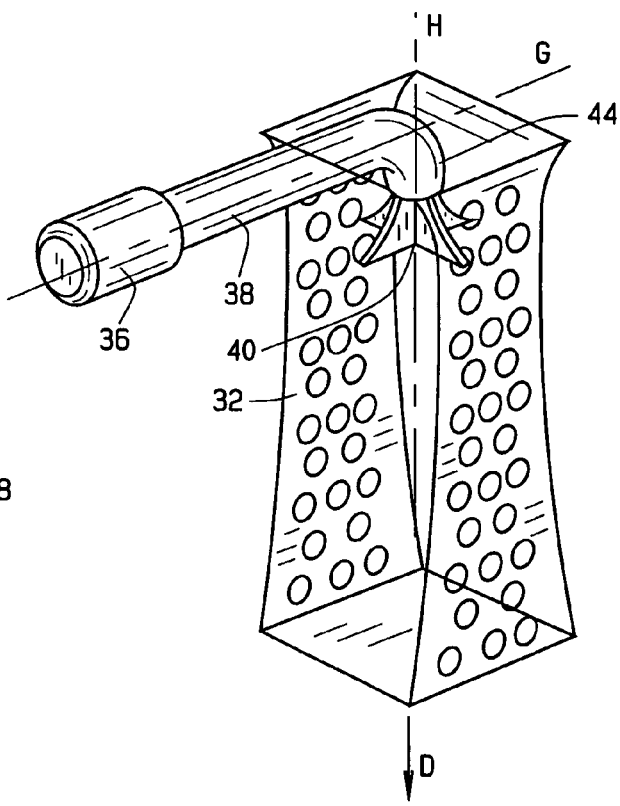
FIG. 4 is an alternate preferred embodiment of the present invention having the pulsejet inlet diffuser and combustion chamber arranged horizontally and the discharge nozzle arranged vertically to discharge downward into an ejector of the present Invention.

Referring to FIG. 4, the inlet diffuser 36 and the combustion chamber 38 are co-aligned on a horizontal axis G. A bend 44 connectably joins the combustion chamber 38 to the discharge nozzle 40. The discharge nozzle 40 is aligned along a vertical axis H. The discharge nozzle 40 discharges in the thrust direction D into the augmentor cell 32. The discharge nozzle 40 preferably includes an axi-symmetric/circular shape attached to the side panels 22 through structural webbing (not shown). This permits the inlet for the pulsejet to be aligned horizontally while the discharge is aligned vertically providing additional flexibility in the arrangement of the pulsejets. A perpendicular alignment between the inlet and the discharge of the pulsejet are shown, however, any angle can be used to suit arrangement constraints as is reasonable for proper pulsejet 20 operation.

Figure 5:
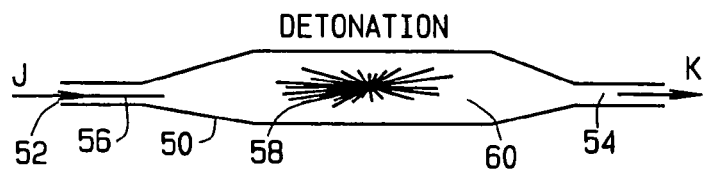
FIG. 5 Is a sectioned elevation view of a conventional pulsejet during detonation.

FIGS. 5 through 9 depict a complete operating cycle for a pulsejet engine known in the art. Referring to FIG. 5, a pulsejet 50 known in the art is detailed. The pulsejet 50 includes an inlet diffuser 52 which receives air in an inlet flow direction J. An exhaust nozzle 54 discharges flow from the pulsejet 50 in an exhaust flow direction K. A mechanical valve 56 is included in the inlet diffuser 52 to prevent a backflow of detonated gas from back flowing into the inlet diffuser 52. In FIG. 5, a detonation stage of a fuel/air mixture 58 in a combustion chamber 60 is shown.

Figure 6:
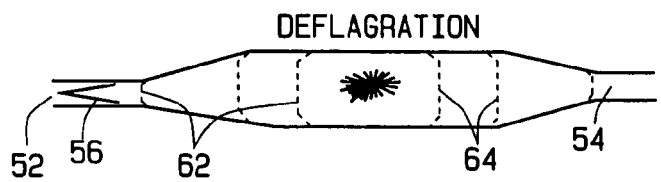
FIG. 6 is the sectioned elevation view of FIG. 5 further showing pressure waves closing a mechanical valve and providing discharge thrust.

Referring to FIG. 6, after the fuel/air mixture 58 of FIG. 5 detonates in the combustion chamber 60, a plurality of reverse pressure waves 62 are generated in a deflagration stage. The reverse pressure waves 62 and the resultant combustion gas travel toward the inlet diffuser 52 and cause the mechanical valve 56 to close preventing flow of the gas through the inlet diffuser 52. A plurality of forward pressure waves 64 is also generated during the deflagration stage. The forward pressure waves 64 and combustion gas travel in the direction of the exhaust nozzle 54 generating thrust from the pulsejet.

Figure 7:
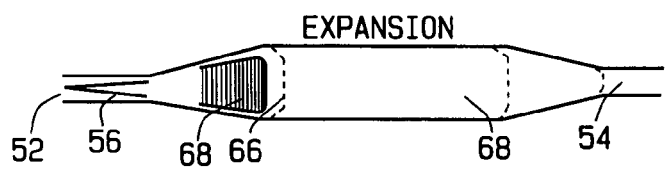
FIG. 7 is the sectioned elevation view of FIG. 6 further showing the partial opening of the mechanical valve and inflow of a fuel/air mixture Into the combustion chamber.

Referring to FIG. 7, after a majority of the combustion gas exhausts through the exhaust nozzle 54, the pressure in the combustion chamber 60 reduces and the pressure of the air supply at the inlet diffuser 52 opens the mechanical valve 56. As the mechanical valve 56 opens, a new supply of air and fuel enters the combustion chamber 60. A plurality of air expansion pressure waves 66 lead a fuel/air mixture 68 into the combustion chamber 60.

Figure 8:
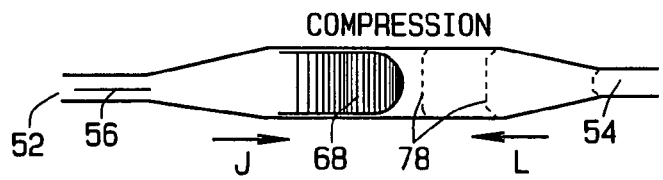
FIG. 8 is the sectioned elevation view of FIG. 7 further showing a fully opened mechanical valve and a fuel/air mixture compression cycle.

Referring to FIG. 8, in a compression stage compression of the fuel/air mixture 68 begins to occur in the combustion chamber 60. The mechanical valve 56 is fully open allowing air flow through the inlet diffuser 52 in the inlet flow direction J. A plurality of high temperature discharge nozzle backpressure waves 70 reflect from the exhaust nozzle 54. The discharge nozzle backpressure wave 70 temperature is approximately 1,500 degrees Fahrenheit (815° C.). The discharge nozzle backpressure waves 70 travel in the nozzle backpressure direction L. When the discharge nozzle backpressure waves 70 contact the fuel/air mixture 68 the fuel/air mixture 68 initially compresses in the combustion chamber 60.

Figure 9:
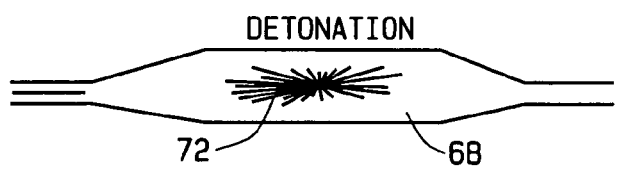
FIG. 9 is the sectioned elevation view of FIG. 8 further showing a fuel/air mixture detonation following a collision between the fuel/air mixture with reflected backpressure waves from a previous detonation.

Referring to FIG. 9, when the high temperature discharge nozzle backpressure waves 70 contact the fuel/air mixture 68 (shown in FIG. 8), and the fuel/air mixture 68 temperature rises to its ignition temperature, a detonation of the fuel/air mixture 68 occurs in the combustion chamber 60. The fuel/air mixture 68 detonates at a fuel/air detonation point 72 and a new cycle for the pulsejet 50 begins. The detonation, exhaust, compression and new detonation cycle occurs rapidly in the pulsejet engine, e.g. approximately 60 to 100 cycles per second as is known in the art. Fuel is either continuously pressurized and fed by a fuel injection system (shown and discussed in reference to FIG. 10), or is pulse pressurized to enter at the optimum time of each engine operating cycle. Detonation is normally initiated and can also be controlled using a detonation device (not shown) such as a spark plug.

Figure 10:
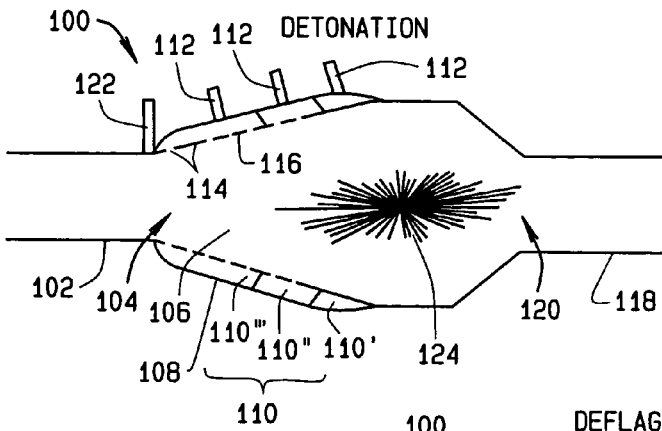
FIG. 10 is a sectioned elevation view of a preferred embodiment of a pulsejet engine of the present Invention during a detonation cycle.

FIGS. 10 through 13 show a single cycle of operation of a pulsejet applied in the present invention. Referring to FIG. 10, a pulsejet 100 includes an inlet diffuser 102 connected to an upstream inlet port 104 of a combustion chamber 106. The combustion chamber 106 is enveloped by a boundary layer air plenum 108. The boundary layer air plenum 108 provides a plurality of side injection boundary layer air ports 110, (designated as exemplary boundary layer air ports 110', 110", and 110"') for introduction of a boundary layer air supply (not shown) through at least one supply line 112. The source for boundary layer air can include compressed air, oxygen generating candies, or bleed air. Boundary layer air enters the combustion chamber 106 through a plurality of apertures 114 in a body section 118 (shown in an exemplary conical shape) of the combustion chamber 106. The apertures 114 in the body section 116 can have the same aperture size or can increase or decrease in size, as viewed in FIG. 10, from right to left as the apertures 114 are positioned along the body section 116. The body section 116 and the combustion chamber 106 can also be provided in other geometric shapes. One or more boundary layer air ports 110 can be used.

The combustion chamber 106 tapers down and connects to a discharge nozzle 118 at a downstream exit port 120. A fuel supply (not shown) is fed or injected into the inlet diffuser 102 upstream of the upstream inlet port 104 through one or more fuel supply lines 122. Fuel supply lines 122 can also enter the combustion chamber 106, or divide between both the upstream inlet port 104 and the combustion chamber 106. A detonation stage is depicted in FIG. 10. A fuel and air mixture detonates in the combustion chamber 106 at a fuel/air detonation point 124.

Figure 11:
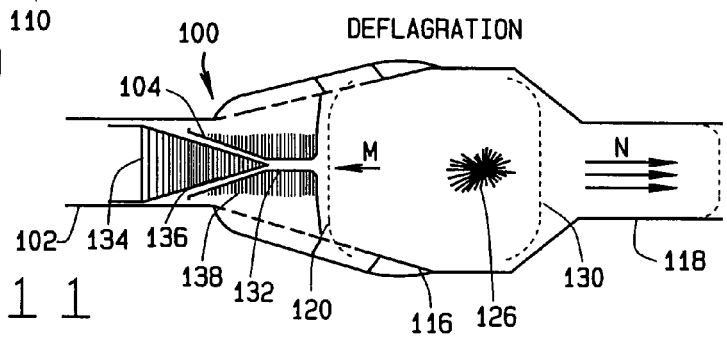
FIG. 11 is the sectioned elevation view of FIG. 10 further showing the deflagration step following detonation wherein the air and fuel flow are choked off by compression of boundary layer injection air flow by the pressure wave generated during the detonation phase.

Referring to FIG. 11, following the detonation stage shown in FIG. 10, a deflagration stage of the pulsejet 100 is shown. A fuel/air deflagration mixture 126 is shown. As the fuel/air mixture continues to burn and expand beyond the fuel/air deflagration mixture 126, a plurality of reverse pressure waves 128 form. The reverse pressure waves 128 travel in the reverse pressure wave direction M toward the inlet diffuser 102 (shown in FIG. 10). A plurality of forward pressure waves 130 also form. The forward pressure waves 130 travel in the thrust direction N into the discharge nozzle 118. The reverse pressure waves 128 contact an entering boundary layer air volume 132 and compress the boundary layer air volume 132 in the direction of the inlet diffuser 102.

A fresh air stream 134 combines with fuel supplied through the fuel supply line 122 (shown in FIG. 10) to form a fuel/air mixture 136. The boundary layer air: volume 132 contacts the fuel/air mixture 136 and a choke point 138 is formed. At the choke point 138, the pressure of the now compressed boundary layer air volume 132 equals or exceeds the pressure of the fresh air stream 134 and further flow of the fresh air stream 134 into the combustion chamber 106 is temporarily blocked. The pressure of the boundary layer air volume 132 driven by the reverse pressure waves 128 also exceeds the pressure of the fuel injection system (not shown) at the fuel supply line 122, or, a sensor of the fuel injection system signals a fuel cut-off therefore preventing input of fuel during the deflagration stage.

High pressure within the combustion chamber 106 still exists at the stage where the choke point 138 is created. The pressure in the combustion chamber 106 is relieved as thrust in the thrust direction N as the forward pressure waves 130 travel toward the discharge nozzle 118. The high pressure of the reverse pressure waves 128 force more and more of the boundary layer air flow injected through the boundary layer air plenum 108 (shown In FIG. 10) away from the discharge nozzle facing end of the boundary layer air plenum 108 towards the inlet diffuser facing end boundary layer air flow is constricted to flow through an increasingly smaller injection area which causes the velocity and subsequent penetration of the boundary layer air flow into the fresh air stream 134 to increase. In effect, this creates a pneumatic throat or venturi which not only chokes the fresh air stream 134 from entering the pulsejet 100, but also prevents combustion by-products from exiting the engine via the inlet diffuser 102. The choke point 138 location is determined in part by the shape of the body section 116 of the combustion chamber 108, and by the pressure of the reverse pressure waves 128.

Figure 12:
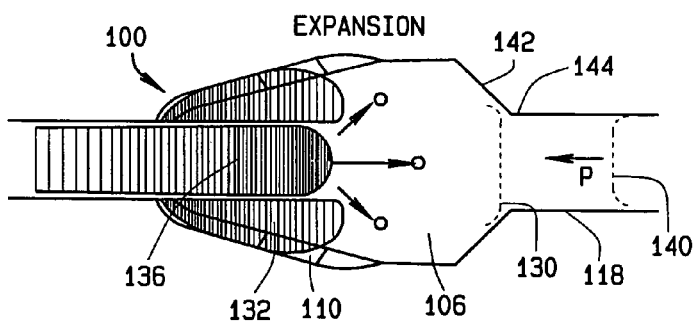
FIG. 12 is the sectioned elevation view of FIG. 11 further showing the expansion of a fuel/air fuel mixture into the combustion chamber of a pulsejet engine of the present invention following thrust exhaust of the previously detonated air fuel mixture.

Referring now to FIG. 12, during an expansion stage the deflagration pressure and its effect on the boundary layer air volume 132 is reduced by thrust discharge through the discharge nozzle 118 and back reflection of the reverse pressure waves 128 from the choke point 138 (identified in FIG. 11). The reverse pressure waves 128, traveling in the direction P, encounter the choked flow, reflect and travel in the direction of expansion direction arrows O. This reflection, together with the forward pressure waves 130 exiting the combustion chamber 106, create a diffusion process which subsequently decreases the pressure in the combustion chamber 106. The pressure differential between the fuel/air mixture 136 and the pressure in the combustion chamber 106 causes the fuel/air mixture 136 to flow again into the combustion chamber 106 in the direction of expansion arrows O.

The reduced pressure in the combustion chamber 106 allows the boundary layer air volume 132 redistribute itself throughout the boundary layer air plenum 106 (described in reference to FIG. 10) and the combustion chamber 106 from the boundary layer air ports 110. As the boundary layer air flow is redistributed, it is allowed to pass through an ever increasing passage porosity (i.e., the injection area increases). With constant injection pressure and airflow, an increased area necessitates lower velocity injection due to fundamental gas laws. A lowered combustion chamber pressure and increased fresh air charge also help guide the boundary layer air flow to the outer combustor walls of the body section 116. This serves to partially cool and isolate the hot combustor section from the inlet and also stabilizes subsequent combustion processes by focusing the combustion processes toward the fuel/air detonation point 124 (shown in FIG. 10). In this expansion stage, the forward pressure waves 130 have reached the discharge nozzle 118. A plurality of discharge nozzle back-pressure waves 140 in the form of rarefaction waves begin to form in this stage. The discharge nozzle back-pressure waves 140 create a sub-ambient expansion which partially induces ejector airflow and combustion by-products from the last cycle into the discharge nozzle 118. The discharge nozzle back-pressure waves 140 also travel in the direction P.

Figure 13:
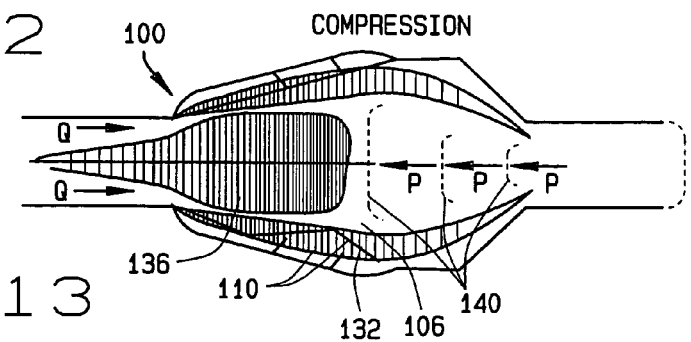
FIG. 13 is the sectioned elevation view of FIG. 12 further showing the fuel/air mixture in the combustion chamber colliding with reflected pressure waves from the discharge nozzle of the pulsejet of the present invention prior to detonation of the air fuel mixture.

Referring now to FIG. 13, in a compression stage the fuel/air mixture 136 traveling in an fuel/air flow direction 0 begins to contact the discharge nozzle back-pressure waves 140. The fuel/air mixture 136 begins to compress in the combustion chamber 106. A stabilizing volume of the previously expanded boundary layer air volume 132 is shown as it compresses along the perimeter of the combustion chamber 106. The compression stage shown in FIG. 13 shows the plurality of discharge nozzle back-pressure waves 140 immediately before detonation of the fuel/air mixture 136 similar to the detonation shown in FIG. 10. Detonation begins a new cycle for the pulsejet Referring back to FIG. 12, the combustion chamber 106 includes a taper section 142. The taper section 142 ends at a taper distal end 144 which is the connecting point for the discharge nozzle 118. The geometry of the taper section 142 also helps provide the constriction of the out flowing gases and the generation of the discharge nozzle back-pressure waves 140.

Figure 14:
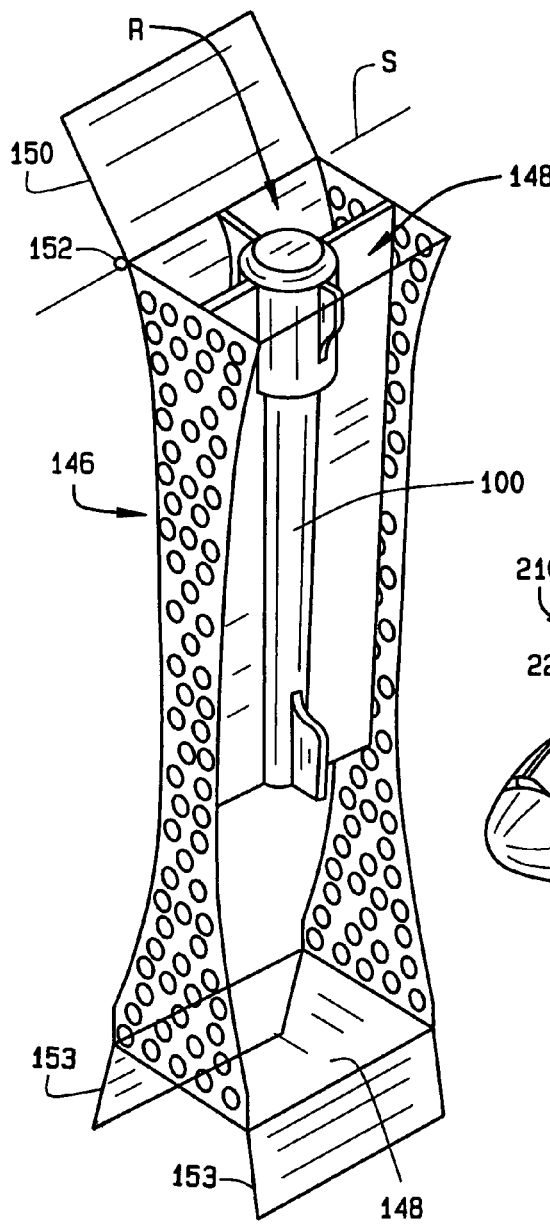
FIG. 14 is the sectioned elevation view of FIG. 3 further showing a rotatable cowl at an inlet aperture of the pulsejet of the present invention.

Referring to FIG. 14, an exemplary pulsejet bay 146 as applied in the present invention is shown. An upper aperture 148 of the pulsejet bay 146 can be partially or completely closed by an upper cowl 150. In the exemplary embodiment shown, the upper cowl 150 is mounted to the pulsejet bay 146 by a hinge 152 or similar mechanical element. The upper cowl 150 rotates along an arc R about a hinge center-line S to a closed position. The upper cowl 150 is controlled by a control system (not shown). Air inlet flow to the pulsejet 100 in the pulsejet bay 146 can be controlled by the single upper cowl 150 shown or by two or more cowls (not shown) similar to the upper cowl 150. Lower cowls 153 can be provided at the bottom aperture 148 of each of the pulsejet bays 146 to control the thrust produced in each pulsejet bay 146. In another preferred embodiment, the upper cowl 150 is provided as a flexible member, which rolls out from a reel (not shown), which replaces the hinge 152 to the closed, phantom position shown.

Figure 15:
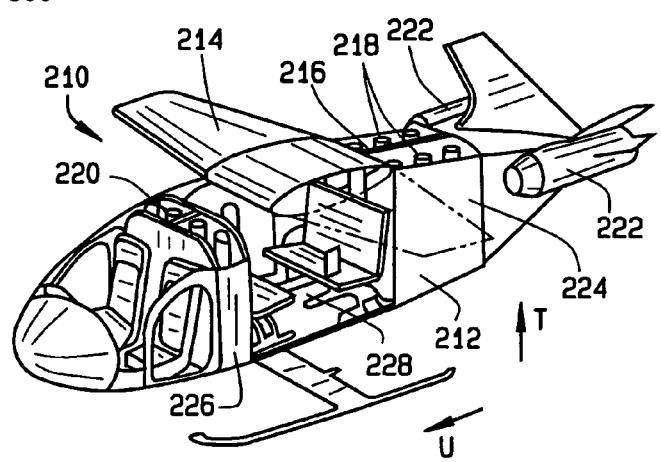
FIG. 15 is a perspective view of an exemplary aircraft of the present invention having both conventional main propulsion engines for horizontal flight and multiple banks of pulsejet engines providing (or VTOL) capability.

Referring to FIG. 15, an exemplary VTOL aircraft 210 according to a preferred embodiment of the present invention is shown. The VTOL aircraft 210 structurally includes a fuselage, or body, 212 and a pair of flight wings 214. To provide VTOL capability, a plurality of pulsejet/ejector banks are provided. A pair of pulsejet/ejector aft banks 216 and a pulsejet/ejector forward bank 220 are provided. Each of the pulsejet/ejector aft banks 216 and the pulsejet/ejector forward bank 220 include a plurality of pulsejet engines 218.

The pulsejet/ejector aft banks 216 and the pulsejet/ejector forward bank 220 provide vertical takeoff capability in the vertical lift direction T. In order to provide horizontal or axial flight capability for the VTOL aircraft 210, a pair of main flight engines 222 are shown, as known in the art. The main flight engines 222 provide for axial flight of the VTOL aircraft 210 in an axial flight direction U.

The pulsejet/ejector aft banks 216 are provided in an aft compartment 224 of the VTOL aircraft 210. The structure supporting each of the pulsejet engines 218 is integrated into the aft compartment 224 such that structural loads of the VTOL aircraft in the aft compartment 224 area are at least partially supported by the pulsejet/ejector aft banks 216. Similarly, structure of the pulsejet/ejector forward bank 220 is integrated into the VTOL aircraft 210 in a forward compartment 226. The vertical thrust generated by each of the pulsejet/ejector aft banks 216 and the pulsejet/ejector forward bank 220 is centered about a VTOL aircraft 210 center of gravity 228. By centering the pulsejet banks about the center of gravity 228, individual pulsejet engines 218 cart be throttled to affect the attitude of the VTOL aircraft 210 during takeoff and landing procedures.

Figure 16:
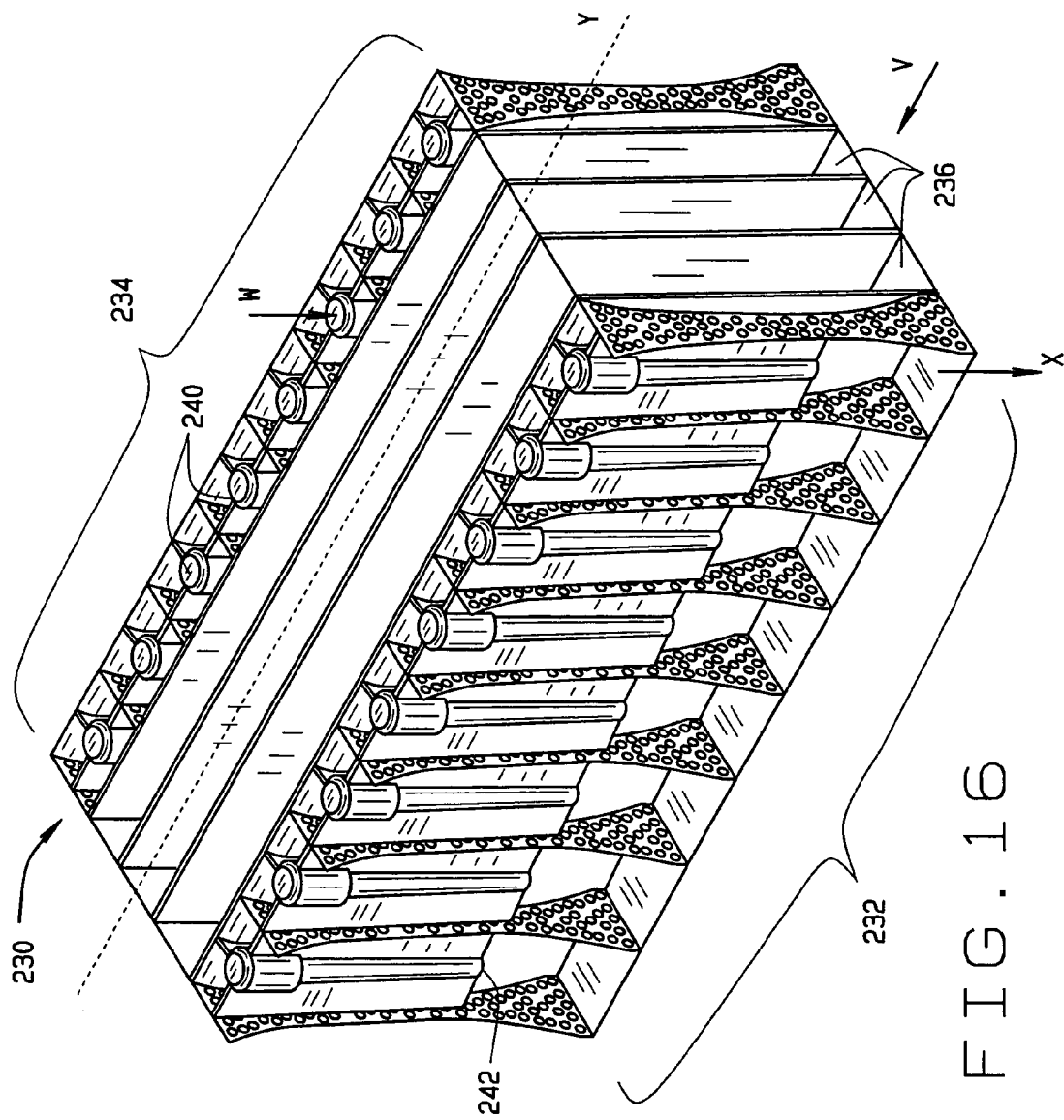
FIG. 16 is a perspective view of an exemplary arrangement of two banks of pulsejet engines separated by typical structure of an aircraft.

Referring now to FIG. 16, another preferred embodiment for pulsejet/ejector banks of the present invention is shown. The pulsejet/ejector bank 230 includes a pulsejet/ejector port bank 232 and a pulsejet/ejector starboard bank 234, respectively. One or more interior compartment bays 236 are provided between both the pulsejet/ejector port bank 232 and the pulsejet/ejector starboard bank 234, The interior compartment bay(s) 236 can be used for a variety of aircraft purposes, including stowage, fuel stowage. In one preferred embodiment a single compartment bay 236, i.e. payload bay, is provided that is used to carry personnel, such as military troops.

Each pulsejet 238 includes an inlet diffuser 240 wherein ambient air is drawn into the pulsejet 238, and an exhaust nozzle 242 where exhaust gases generating vertical thrust by each of the pulsejets 238 discharge. Forward thrust is provided by the main flight engines 222 (shown in FIG. 15) to provide thrust to propel the VTOL aircraft 210 in the aircraft forward direction V. Ambient air enters each of the pulsejets 238 in the air inlet direction W. Exhaust gases generating vertical thrust by each of the pulsejets 238 discharges from the pulsejets 238 in the thrust direction X. In the exemplary arrangement shown by FIG. 16, both the pulsejet/ejector port bank 232 and the pulsejet/ejector starboard bank 234 are approximately equally spaced about an aircraft longitudinal centerline Y.

Referring to FIG. 17, the pulsejet/ejector port bank 232 of FIG. 16 is shown in greater detail. An inlet cowl 244 is partially shown in a closed position isolating augmentor bays 245. The inlet cowl 244 is shown as a unitary cowl capable of isolating all of the pulsejets of the pulsejet/ejector port bank 232. The inlet cowl 244 can also be provided as individual cowls isolating each of the augmentor bays 245 individually.

A pair of exhaust cowls 246 are joined to the pulsejet/ejector port bank 232 at each of a plurality of augmentor bay exhaust ports 247. The pair of exhaust cowls 246 are rotatably attached to the structure of the pulsejet/ejector port bank 232 and operate from a fully open to a fully closed position for the augmentor bay exhaust ports 247. By rotating one or both of the exhaust cowls 246, or modifying the fuel supply, discharge thrust from the pulsejets in the pulsejet/ejector port bank 232 can be controlled. Similar to the inlet cowl 244, the exhaust cowls 246 can also be completely shut to provide isolation of one or all of the augmentor bays 245. The exhaust cowls 246 can also be provided, similar to the inlet cowl 244, as individual cowls (not shown) isolating each of the augmentor bay exhaust ports 247, or an intermediate number of cowls isolating 2 or more bays (not shown). Depending upon the simplicity of the design desired, either or both the inlet cowl 244 and the exhaust cowls 246 can be eliminated to reduce complexity and weight of the pulsejet bank.

Referring now to FIG. 18, the individual operating stages of a VTOL aircraft of the present invention are shown. In a ready step 248, a bank of pulsejet engines in a pulsejet ejector thrust augmentor (PETA) bank are idle. The PETA engines are disclosed in co-pending U.S. patent application Ser. No. 10/245,519 commonly assigned to the assignee of the present invention, and entitled, "Pulsejet Ejector Thrust Augmentor", filed Sep. 16, 2002, the disclosure of which is incorporated by reference herein in it's entirety. The main propulsion turbine engines are also idle. In a vertical lifting step 250, the PETA banks power level are increased to approximately 90%. The main propulsion engine(s) power is increased to approximately 30%. Initial vertical lift of the aircraft begins at this stage as well as horizontal motion. In a forward engine initiation step 252, PETA power is increased to full 100% power and the main propulsion engine(s) power is increased to approximately 60%. The aircraft pitches nose down and the PETA power assists in accelerating the aircraft. In a transitioning step 254, the PETA power decreases in a range between approximately 100% to 50% power. The pulsejet engines are slowly throttled down during this step and the main propulsion engine(s) power is increased to 100% to transition to horizontal flight. As the aircraft transitions, the nose is pitched up and the wings begin to generate lift. In an acceleration step 256, the PETA engines are reduced in power to approximately 30% and the main propulsion engine power is maintained at 100%. Aircraft acceleration continues and the pulsejet engine power is significantly reduced as the aircraft approaches its nominal flight speed. At this point, the full weight of the aircraft is supported by its wings. In a cruise step 258, normal horizontal flight of the aircraft is achieved. The banks of PETA engines are shut down during this stage and the inlets to the PETA engines are isolated. Main propulsion turbine engines are throttled as required during this final stage where normal aircraft cruising speed has been achieved. In the exemplary arrangement shown in FIG. 18, an exemplary time of about 60 seconds elapses between the ready step 248 and the cruise step 258.

Referring now to FIG. 19, in a cruise step 260, similar to the cruise step 258 shown in FIG. 18, the PETA engines are in their stowed and powered down conditions and the main propulsion engines of the aircraft are in their normal cruise condition. In an initiating step 262, the PETA engines are initiated and the aircraft is maneuvered into a descent orientation. In a descent step 264, aircraft speed is reduced by reducing the main propulsion engine power from 100% to approximately 50% while increasing the PETA engine power up to approximately 60%. In a stalling step 266, the aircraft is positioned to stall the wings of the aircraft. The main propulsion engine power is further decreased to approximately 30% and the PETA engines are throttled up to provide just below a climbing power. In a hovering step 268, the PETA engines are just below 100% operating power (just below climbing power) and the aircraft is in a brief hover mode. Main propulsion engine power is retained at about 30% power during this stage to provide minimum forward thrust of the aircraft. In a (ending step 270, the aircraft has landed and the PETA's engines are idled and the main propulsion engines are shut down. Any cowls on the PETA engines are isolated at this time. In the exemplary configuration shown in FIG. 19 for a landing procedure, an exemplary time of approximately 90 seconds elapses to bring the aircraft from an altitude of approximately 200 feet to a landing position.

Figure 20:
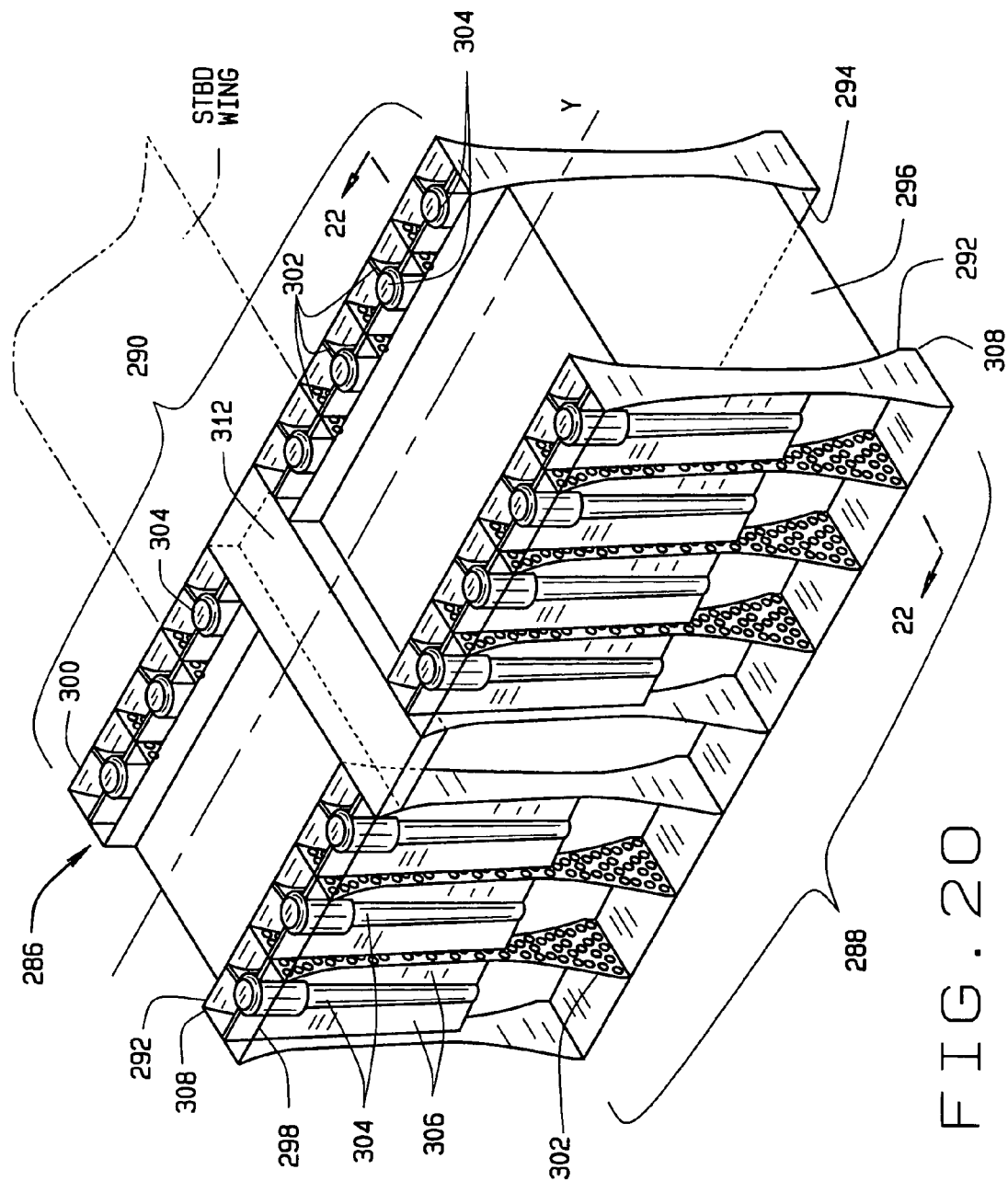
FIG. 20 is a perspective view of another embodiment similar to the exemplary arrangement of FIG. 16 showing partial exemplary structure to integrate the pulsejet banks into aircraft structures.
Figure 21:
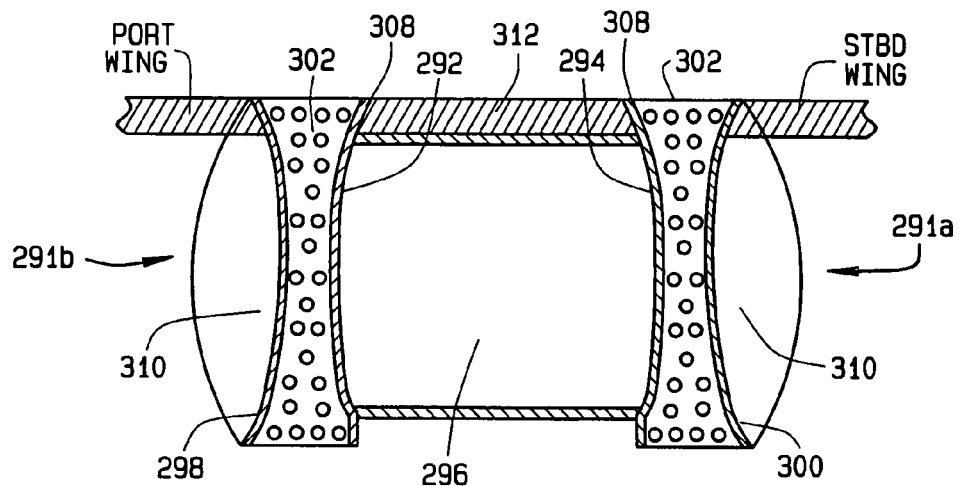
FIG. 21 is an end elevation view taken along section 22 of FIG. 20, looking forward.

Referring now to FIGS. 20 and 21, in yet another preferred embodiment, a pulsejet/ejector port bank 288 and a pulsejet/ejector starboard bank 290 are structurally integrated within sidewalls 291a and 291b of the aircraft structure. A port inner side panel 292 of the port bank 288 and a starboard inner side panel 294 of the starboard bank 290 form the exterior walls of an interior payload bay 296. A port outer side panel 298 of port bank 288 and a starboard outer side panel 300 of the starboard bank 290 are connected by a plurality of apertured divider plates 302. The apertured divider plates 302 also provide structural rigidity for the assembly. Each of the pulsejets 304 are structurally attached at least one of the inner walls 292 and 294 or the outer walls 298 and 300 using one of a plurality of interfairings 306 provided for each pulsejet 304.

By including the structure of the pulsejet/ejector bank 286 into the structure of sidewall 291a and 291b, separate engine support structure which is normally used to support main flight engines, such as the main flight engines 222 shown in FIG. 15, is not required. Insulation layers 308 can also be incorporated in the structure of the pulsejet/ejector bank 286 such that pulsejet acoustic levels can be attenuated. Storage compartments 310 can be integrated. A wing structure 312 can also be incorporated into the pulsejet/ejector bank 286 allowing the pulsejet/ejector bank 286 to be totally enclosed within the fuselage of the aircraft. This reduces the aerodynamic drag of the aircraft and permits the aircraft to achieve supersonic flight (if desirable).

Figure 22:
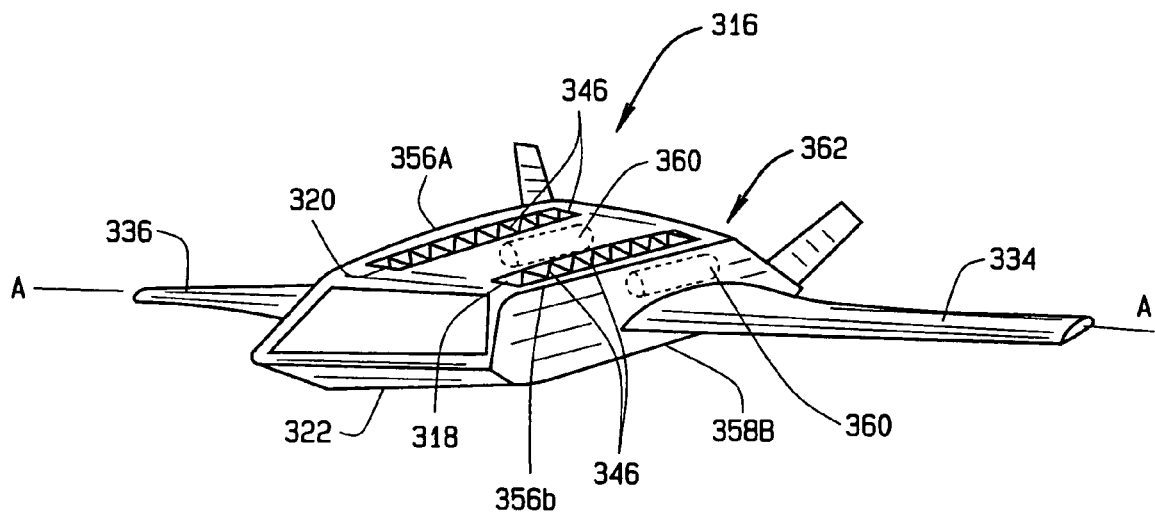
FIG. 22 is a perspective view of another embodiment showing an exemplary tactical VTOL aircraft.
Figure 23:
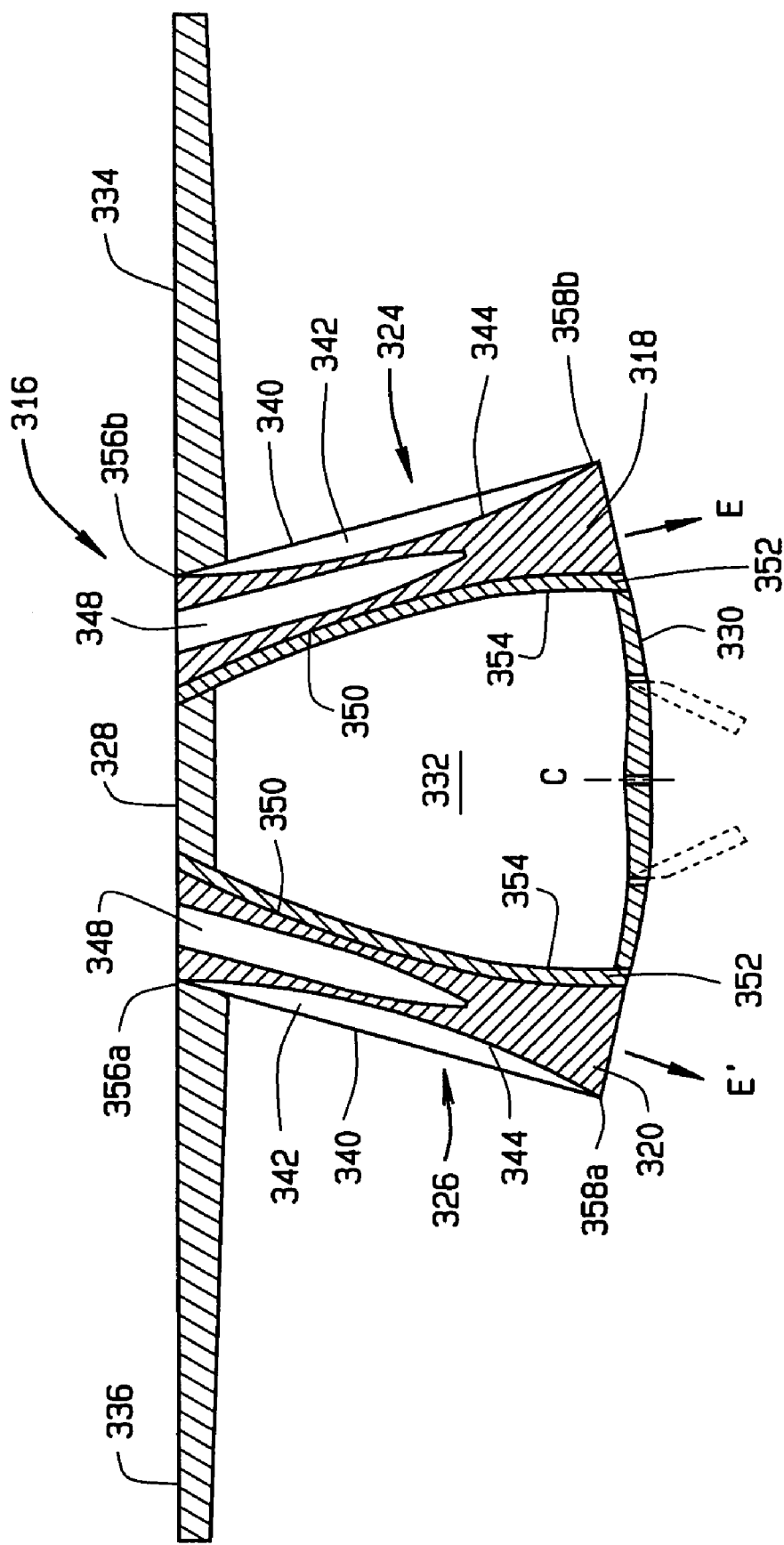
FIG. 23 is a cross-sectional view of the tactical VTOL aircraft shown in FIG. 23, taken along the line A—A.
Figure 24:
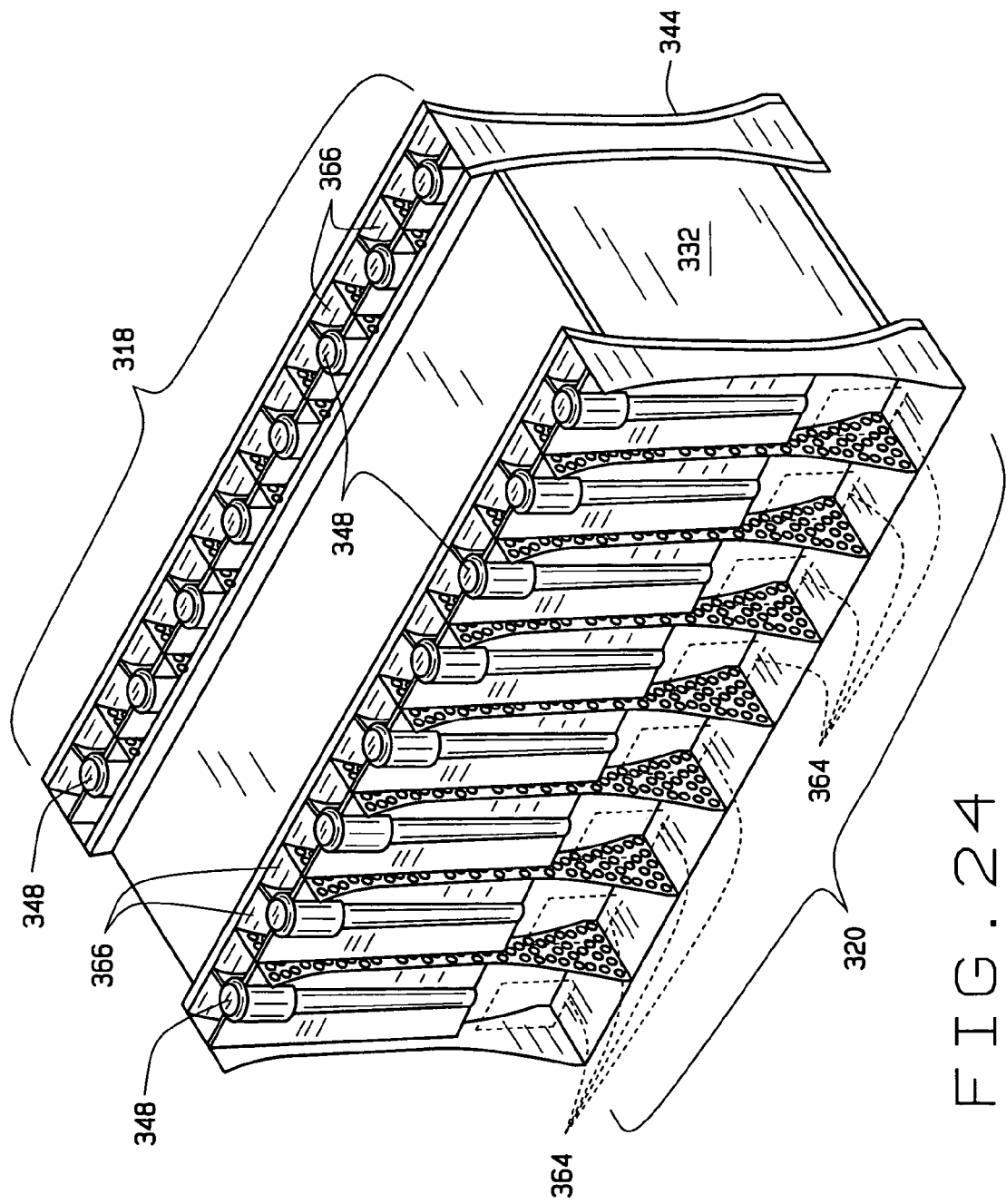
FIG. 24 is a perspective view of a pair of pulsejet ejector thrust augmentor banks incorporated in the VTOL aircraft shown in FIG. 23.

Referring now to FIGS. 22, 23 and 24, another preferred embodiment of the present invention is shown illustrating a VTOL aircraft 316 adapted for tactical military use. That is, VTOL 316 is adapted for covert deployment and low vulnerability to hostile detection and aggression. Similar to the embodiment described in reference to FIGS. 20 and 21, VTOL aircraft 316 integrates a port pulsejet ejector thrust augmentor (PETA) bank 318 and a starboard PETA bank 320 into the structure of a fuselage 322 of the VTOL 316. More specifically, port PETA bank 318 and a starboard PETA bank 320 are integrated into the structure of a port sidewall 324 and a starboard sidewall 326, respectively. The fuselage 322 includes the port and starboard sidewalls 324 and 326, a top 328 and a bottom 330 that form a payload bay 332. Payload bay 332 is suitable for carrying various cargo such as troops, supplies, and/or weapons. As described below, payload bay 332 is an armored payload bay that provides a great deal of protection for the cargo/troops therewithin. VTOL aircraft 316 additionally includes a pair of wings 334 and 336. In a preferred embodiment the wings 334 and 336 have a fixed length adapted so that VTOL aircraft 316 will fit inside a cargo bay of a larger aircraft (not shown). More specifically the wingspan of the wings 334 and 336 is constrained so that the VTOL aircraft 316 can fit into the payload bay of a larger aircraft, such as a military C-17 transport, without the use of wing folds. Therefore, VTOL aircraft 316 can be transported within, and aerially deployed from the larger aircraft.

In a preferred alternate embodiment the wings 334 and 336 are adapted to fold so that the wings 334 and 336 can have a greater length to enable the VTOL aircraft 316 to have a much increased payload and range. In this embodiment, the wings 334 and 336 would be collapsed, or folded, so that the VTOL aircraft 316 can fit into the payload bay of a larger aircraft, e.g. a C-17 transport. The VTOL aircraft 316 can then be transported to a remote ground location, removed form the larger aircraft, and deployed from the remote ground location.

By incorporating the PETA banks 318 and 320 into the sidewalls 324 and 326, each of the sidewalls 324 and 326 provide a plurality of layers of protection for payload bay 332. These protective layers greatly reduce the vulnerability of flying objects, such as ground fire, from infiltrating payload bay 332. Thus, VTOL 316 provides considerable protection to troops or other cargo within payload bay 332. To provide these layers of protection, any or all of the structural components of the sidewalls 324 and 326 are constructed of materials that are resistive to penetration by high velocity flying objects, such as hostile ground fire and flying debris. In one preferred embodiment, each of the sidewalls 324 and 326 includes an outer skin 340 constructed of a protective material such as aluminum or a penetration resistive composite, e.g. Kevlar® or fiberglass, that provides a layer of protection. Each of the sidewalls 324 and 326 additionally includes a storage compartment 342 used to store such things as field equipment, supplies and fuel, thereby providing a layer of protection.

The PETA banks 318 and 320 are structurally integrated into sidewalls 324 and 326, respectively. Each of the PETA banks 318 and 320 include an outer side panel 344 that is constructed of a penetration resistive material, such as aluminum, steel, Kevlar® or titanium that provides a layer of protection for the payload bay 332. Each of the PETA banks 318 and 320 additionally includes a plurality of augmentor cells 346 that each include a pulsejet 348. In this embodiment, the pulsejets are constructed of a material such as steel or titanium to thereby provide a layer of protection from high velocity flying objects infiltrating the payload bay 332. Furthermore, each of the PETA banks 318 and 320 includes an inner side panel 350 constructed of a material such as aluminum, steel, Kevlar® or titanium that provide a layer of protection.

Each of the sidewalls 324 and 326 further includes a layer of insulation 352 adapted to attenuate acoustic levels of the PETA banks 318 and 320. The insulation layer 352 can include any suitable insulation such as foam or a honeycomb core. Each layer of insulation 352 additionally provides payload bay 332 with a layer of protection from infiltration by high velocity flying objects. Further yet, each of the sidewalls 324 and 326 includes a payload bay panel 354 that form the walls of the payload bay 332. Each of the payload bay panels 354 is constructed of a material such as aluminum, steel, Kevlar® or titanium to provide yet another layer of protection for the payload bay 332. In addition to the sidewalls 324 and 326 providing a plurality of layers of protection for the payload bay 332, the payload bay bottom 330 is armored to protect payload bay 332. That is, the bottom 330 is constructed of a material such as steel, Kevlar® or titanium to also protect payload bay 332 from infiltration by high velocity flying objects. Although each of the of layers of protection included in the sidewalls 324 and 326, and the bottom 330 have been described as being constructed of a single suitable materials, it is envisioned that each layer and the bottom 330 can also be constructed to include more than one material. For example, any or all the layers of protection and the bottom 330 could be constructed having a core of one particular material that is plated with second material to thereby form a penetration resistant layer of protection for the payload bay 332.

The payload bay bottom 330 further includes a passage means that allows for the ingress and egress of cargo from the payload bay 332. For example, the payload bay 330 can include at least one bay door (illustrated in phantom in FIG. 23) that allows troops to 'fast rope', i.e. repel, down to a landing zone while the VTOL aircraft 316 hovers over the landing zone. The bay door(s) could also be utilized to allow troops to enter the payload bay 332 in necessary circumstances. As another example of a passage means, the payload bay bottom 330 could include or at least one 'man-hole' that provides a passage for the ingress and egress of troops or other cargo.

In one preferred embodiment, the PETA banks 318 and 320 are canted outward such that thrust exhausts produced by each of the PETA banks 318 and 320 are respectively directed in exhaust directions E and E' that are down and away from a centerline C of the payload bay 332. By directing the thrust exhausts of the PETA banks 318 and 320 in the directions E and E', troops can 'fast rope' down from an airborne VTOL aircraft 316 with minimal interaction with the hot thrust exhausts. In another preferred embodiment, the sidewalls 324 and 326 are constructed such that the outer skins 340 are canted outward. Canting the outer skins 340 reduces vulnerability to glancing high velocity flying objects, e.g. ground fire, that will tend to be deflected away from the fuselage 322 and the payload bay 332. In a preferred embodiment, the outer skins 340 are canted approximately 15° to 45°.

The VTOL aircraft 316 is further adapted to reduce vulnerability to a dangerous detection, i.e. observation, methods and threats, such as radar, infrared, acoustical, electromagnetic, and visual detection, which pose serious survivability threats to VTOL aircraft 316. Generally, any break of distinct feature of the exterior surface of the VTOL aircraft 316 incorporates long and aligned edges to reduce radar cross section (RCS) returns and spikes. For example, the fuselage 322 and wings 334 and 336 of the VTOL aircraft 316 incorporate long and aligned edges to reduce radar cross section (RCS) returns and spikes. As a further example, an edge 356a is aligned with an edge 356b, an edge 358a is aligned with an edge 358b, and the edge 356a is aligned with the edge 358b, thereby producing thin RCS returns and spike management. Additionally the canted outer skins 342 of the sidewalls 324 and 326 reduce side sector returns by deflecting the radar signals so that direct returns do not occur. It is envisioned that other outer surfaces of the VTOL aircraft 316 can also be canted to further reduce RCS returns. The VTOL aircraft 316 includes at least one main cruise engine 360 that is entirely enclosed within the fuselage 322. By enclosing the main cruise engine(s) 360 within the fuselage 322, massive RCS returns generated by known external cruise engines is significantly reduced or substantially eliminated.

Reduction of infrared (IR) detection is important in defeating either surface or air launched heat seeking missiles. Enclosing the cruise engine(s) 360 within the fuselage 322 reduces vulnerability to IR detection. Additionally, VTOL aircraft 316 includes a lower aft deck 362. The exhausts from the cruise engine(s) 360 flows over the lower aft deck 362 and into the ambient airstreams. Thus, the lower aft deck visually blocks the exhaust from view from below the VTOL aircraft 316 and also mixes the exhaust with ambient air to cool the exhaust, thereby reducing IR detection of the hot exhausts. Furthermore, the cruise engine(s) 360 include high efficiency, high bypass turbofans that cool the exhaust from the cruise engine(s) 360 to further reduce the vulnerability to IR detection.

Acoustical threats include far field acoustic signatures that allow hostile forces to vector resources to intercept an aircraft and near field noise associated with takeoff and landing of aircraft. With the main cruise engine(s) 360 being enclosed with the fuselage 322 and including high bypass turbofans, the VTOL aircraft 316 has a greatly reduced vulnerability to far field acoustical detection. As described above, the VTOL aircraft 316 utilizes the pulsejet engines for vertical propulsion. The pulsejets 348 characteristically produce noise having a generally narrow bandwidth in comparison to the extremely broad bandwidth of noise produced by helicopter rotors. Additionally, increasing the size of the pulsejets 348 further narrows the bandwidth of noise produced during operation. Furthermore, the acoustic signature of each of the PETA banks 318 and 320 is further suppressed by at least one absorber, generally illustrated at 364, included in each augmentor cell 366. The absorbers 364 are adapted to further narrow the bandwidth of the noise produced by PETA banks 318 and 320. Each absorber 364 can be an active or passive acoustic barrier, device or abatement material specifically selected to reduce or substantially mute noise within a desired bandwidth. Thus, the level of noise within a desired bandwidth can be reduced or muted based on the type of absorber 364 implemented in the PETA banks 318 and 320.

Threats of visual detection generally target contrail detection and optical detection. The VTOL aircraft 316 can be adapted to incorporate a plurality of known methods to reduce contrail detection. For example, contrail detection can be reduced by destroying nucleation sites that create contrails or enlarging the nucleation sites so that rain is formed instead of ice. Since contrails are formed when the nucleation sites form into ice, enlarging the nucleation sites to form rain will significantly reduce or substantially eliminate the contrails. To reduce the treat of optical detection, the fuselage 322 and wings 334 and 336 incorporate a camouflage scheme. For example, the outer surfaces of the fuselage 322 and wings 334 and 336 can be painted or covered with material having a camouflage scheme. The camouflage scheme reduces noticeable contrast variations of the VTOL aircraft 316 with a surrounding environment. Therefore, the VTOL aircraft 316 will optically blend with the surrounding environment, e.g. the sky. Additionally, the overall shape of the VTOL aircraft 316 is designed to have a simple, non-complex silhouette that further reduces vulnerability to visual detection. Furthermore, the VTOL aircraft is designed such that the number of surfaces that may produce visual glints is minimized.

In one preferred embodiment, the outer skins 340 of the sidewalls 324 and 326 are removable panels that can be interchangeably replaced with any one of a plurality of task specific panels. The task specific panels can have mounted thereon various different task items, including missiles, torpedoes, sonobuoys, rockets, radar, etc. The task specific panels are interchangeable between individual flights of the VTOL aircraft 316. Control equipment, energy sources, such as batteries, and mechanical connecting equipment are further examples of equipment which can be mounted on the task specific panels. Each task specific panel therefore acts as a standalone module. Different types of equipment can also be loaded on opposite panels of the VTOL aircraft 316. Furthermore, the task specific panels are structurally integrated into each of the sidewalls 324 and 326 such that a portion of the load imparted by the task devices as well as the panel itself are integrated into the structure of the fuselage 322.

Thus, the VTOL aircraft 316 is a tactical VTOL aircraft that provides enhance protection for troops or cargo by greatly reducing the vulnerability of the aircraft to hostile detection and aggression.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flight capable said mobile platform, said mobile platform comprising:
    a fuselage adapted to form an armored payload bay including a portion adapted to allow at least one of ingress and egress of cargo into, or from, the payload bay, the fuselage being constructed to reduce the vulnerability of cargo in the armored payload bay to hostile detection of and aggression;
    a pair of wings connected to the fuselage; and
    a pulse ejector thrust augmentor (PETA) bank disposed within the fuselage, the PETA bank including a plurality of interconnected pulsejets and oriented such that a thrust exhaust produced by the bank is directed downwardly and laterally outward from a centerline of the payload bay.

2. The mobile platform of claim 1, wherein the fight capable mobile platform comprises a vertical take off and landing (VTOL) aircraft.

3. The mobile platform of claim 1, wherein the wings comprise a non-alterable wingspan such that the mobile platform can be transported by and deployed from a second mobile platform when the second mobile platform is airborne.

4. The mobile platform of claim 1, wherein the wings are adapted to be moved between a first position and a second position such that the mobile platform forms a reduced cross sectional footprint with the wings in the second position.

5. The mobile platform of claim 1, wherein the fuselage comprises a pair of sidewall including a plurality of layers adapted to provide an interior area of the payload bay protection from infiltration by flying objects.

6. The mobile platform of claim 5, wherein the plurality of layers include an outer skin of each sidewall.

7. The mobile platform of claim 5, wherein the plurality of layers include an integral storage compartment formed in each sidewall.

8. The mobile platform of claim 5, wherein the plurality of layers include an outer side panel of the PETA bank.

9. The mobile platform of claim 5, wherein the plurality of layers include a plurality of pulsejet engines included in the PETA bank.

10. The mobile platform of claim 5, wherein the plurality of layers include an inner side panel of the PETA bank.

11. The mobile platform of claim 5, wherein the plurality of layers include a layer of acoustical insulation included in each sidewall.

12. The mobile platform of claim 5, wherein the plurality of layers include a payload bay panel included in each sidewall.

13. The mobile platform of claim 5, wherein an exterior surface of each sidewall is adapted to be canted to reduce radar cross section side sector returns.

14. The mobile platform of claim 1, wherein the fuselage includes long, aligned edges adapted to reduce radar cross section returns.

15. The mobile platform of claim 1, further comprising a cruise propulsion system disposed within an interior portion of the fuselage to reduce radar cross section returns and acoustical detection.

16. The mobile platform of claim 15, wherein the cruise propulsion system includes a high efficiency, high bypass turbofan adapted to cool an exhaust from the cruise propulsion system to reduce infrared detection.

17. The mobile platform of claim 1, wherein the fuselage includes a lower aft deck adapted to reduce infrared detection.

18. The mobile platform of claim 1, wherein the PETA bank includes at least one absorber adapted to narrow an acoustical bandwidth of noise generated by the PETA bank and thereby reduce acoustical detection.

19. The mobile platform of claim 1, wherein the fuselage and wings include a camouflage scheme adapted to reduce visual detection.

20. A flight capable mobile platform adapted for enhanced protection against hostile detection and aggression, said mobile platform comprising:
    a pair of wings adapted to allow the mobile platform to be transported within a larger airborne second mobile platform;
    an armored payload bay formed within a fuselage of the mobile platform, the armored payload bay including:
        a pair of armored sidewall, each armored sidewall including an exterior surface canted such that top portions of the exterior surfaces are in closer proximity to each other than bottom portions of the exterior surfaces to reduce radar cross section returns, and
        an armored bottom adapted to allow ingress and egress of cargo from the payload bay; and
        at least one pulse ejector thrust augmentor (PETA) bank disposed within each sidewall, each PETA bank including a plurality of interconnected pulsejets and adapted to cant outward such that a thrust exhaust produced by each PETA bank is directed down and outwardly away from a centerline of the payload bay.

21. The mobile platform of claim 20, wherein the flight capable mobile platform comprises a vertical take off and landing (VTOL) aircraft.

22. The mobile platform of claim 20, wherein the wings are adapted to have a fixed wingspan to allow the mobile platform to be transported within, and deployed from, the larger second mobile platform while the larger second mobile platform is airborne.

23. The mobile platform of claim 20, wherein the wings are adapted to be moved between a first position and a second position so that the mobile platform can be transported within the larger second mobile platform to a remote ground location with the wings in the second position.

24. The mobile platform of claim 20, wherein each armored wall comprises a plurality of protective layers adapted to protect an interior area of the payload bay from infiltration by flying objects, the protective layers including at least two of the following:
    an outer skin of each sidewall;
    an integral storage compartment formed in each sidewall;
    a protective outer side panel of each PETA bank;
    a plurality of PETA propulsion devices included in each PETA bank;
    a protective inner side panel of each PETA bank;
    a layer of acoustical insulating included in each sidewall; and
    a payload bay panel included in each sidewall.

25. The mobile platform of claim 20, wherein the fuselage includes long, aligned edges adapted to reduce radar cross section returns.

26. The mobile platform of claim 20 further comprising a cruise propulsion system disposed within an interior portion of the fuselage to reduce radar cross section returns and acoustical detection.

27. The mobile platform of claim 26, wherein the cruise propulsion system includes a high efficiency, high bypass turbofan adapted to cool an exhaust from the cruise propulsion system to reduce infrared detection.

28. The mobile platform of claim 20, wherein the fuselage includes a lower aft deck adapted to reduce infrared detection.

29. The mobile platform of claim 20, wherein each PETA bank includes at least one absorber adapted to narrow an acoustical bandwidth of noise generated by each pulsejets and thereby reduce acoustical detection.

30. The mobile platform of claim 20, wherein the fuselage and wings include a camouflage scheme adapted to reduce visual detection.

31. A flight capable mobile platform adapted for reduced vulnerability to hostile detection of and aggression, said mobile platform comprising:
    a fuselage having an armored bottom and a pair of armored sidewalls that include a plurality of protective layers adapted to protect an interior area of a payload bay from infiltration by flying objects, the armored bottom adapted to allow ingress and egress of cargo from the payload bay;
    a pair of fixed wings connected to the fuselage, the wings having a non-alterable wingspan adapted to allow the mobile platform to be transported within, and deployed from, a larger airborne second mobile platform; and a plurality of pulse ejector thrust augmentor (PETA) banks including a plurality of interconnected pulsejets, wherein at least one PETA bank is disposed within each sidewall and canted outward such that a thrust exhaust produced by each bank is directed down and outwardly away from a centerline of the payload bay;

wherein an exterior surface of each sidewall is canted such that top portions of the exterior surfaces are in closer proximity to each other than bottom portions of the exterior surfaces to reduce radar cross section returns.

32. The mobile platform of claim 31, wherein the flight capable mobile platform comprises a vertical take off and landing (VTOL) aircraft.

33. The mobile platform of claim 31, wherein the plurality of layers includes at least two of:
- an outer skin of each sidewall;
- an integral storage compartment disposed in each sidewall;
- an outer side panel of each PETA bank;
- a plurality of PETA propulsion devices included in each PETA bank;
- an inner side panel of each PETA bank;
- a layer of acoustical insulating included in each sidewall; and
- a payload bay panel included in each sidewall.

34. The mobile platform of claim 31, wherein a plurality of major break lines in an exterior surface of the mobile platform includes long, aligned edges adapted to reduce radar cross section returns.

35. The mobile platform of claim 31 further comprising a cruise propulsion system located within an interior portion of the fuselage to reduce radar cross section returns and acoustical detection.

36. The mobile platform of claim 35, wherein the cruise propulsion system includes a high efficiency, high bypass turbofan to cool exhaust from the cruise propulsion system and thereby reduce infrared detection.

37. The mobile platform of claim 31, wherein the fuselage includes a lower aft deck adapted to reduce infrared detection.

38. The mobile platform of claim 31, wherein each PETA bank includes at least one absorber adapted to narrow an acoustical bandwidth of noise generated by each pulsejets and thereby reduce acoustical detection.

39. The mobile platform of claim 31, wherein the fuselage and wings include a camouflage scheme to reduce visual detection.

* * * * *